United States Patent
Zhou

(10) Patent No.: US 12,451,487 B2
(45) Date of Patent: *Oct. 21, 2025

(54) ELECTROCHEMICAL DEVICE AND ELECTRONIC DEVICE CONTAINING SAME

(71) Applicant: Ningde Amperex Technology Limited, Fujian (CN)

(72) Inventor: Molin Zhou, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,924

(22) Filed: Apr. 25, 2024

(65) Prior Publication Data

US 2024/0282960 A1  Aug. 22, 2024

Related U.S. Application Data

(63) Continuation of application No. PCT/CN2022/076462, filed on Feb. 16, 2022.

(30) Foreign Application Priority Data

Oct. 25, 2021 (WO) ............... PCT/CN2021/126213

(51) Int. Cl.
| | |
|---|---|
| *H01M 4/525* | (2010.01) |
| *H01M 4/02* | (2006.01) |
| *H01M 10/0525* | (2010.01) |
| *H01M 10/0567* | (2010.01) |

(52) U.S. Cl.
CPC ....... *H01M 4/525* (2013.01); *H01M 10/0525* (2013.01); *H01M 10/0567* (2013.01); *H01M 2004/021* (2013.01); *H01M 2004/028* (2013.01); *H01M 2300/004* (2013.01)

(58) Field of Classification Search
None
See application file for complete search history.

(56) References Cited

U.S. PATENT DOCUMENTS

| | | | | |
|---|---|---|---|---|
| 11,114,663 | B2* | 9/2021 | Dai | C01G 51/00 |
| 12,218,312 | B2* | 2/2025 | Suzuki | H01M 4/382 |
| 12,308,428 | B2* | 5/2025 | Zhou | H01M 4/366 |
| 12,327,864 | B2* | 6/2025 | Zhou | H01M 10/4235 |
| 2014/0170492 | A1* | 6/2014 | Xia | H01M 4/505 |
| | | | | 429/219 |
| 2019/0372155 | A1 | 12/2019 | Yersak et al. | |
| 2020/0006769 | A1* | 1/2020 | Paulsen | H01M 4/525 |
| 2021/0151752 | A1* | 5/2021 | Park | H01M 10/052 |
| 2021/0226201 | A1* | 7/2021 | Lim | H01M 4/0428 |
| 2021/0280863 | A1* | 9/2021 | Liu | H01M 10/0525 |
| 2022/0158251 | A1* | 5/2022 | Lee | H01M 50/121 |
| 2022/0190316 | A1* | 6/2022 | Seo | C01G 53/50 |
| 2022/0216460 | A1* | 7/2022 | Kuroda | H01M 4/525 |
| 2022/0223862 | A1* | 7/2022 | Wu | H01M 4/131 |
| 2022/0223904 | A1* | 7/2022 | Choi | C01G 25/006 |
| 2022/0310988 | A1* | 9/2022 | Zhou | H01M 10/0525 |
| 2022/0310998 | A1* | 9/2022 | Zhou | H01M 4/525 |
| 2022/0407064 | A1* | 12/2022 | Seo | H01M 4/505 |
| 2022/0411284 | A1* | 12/2022 | Seo | H01M 4/131 |
| 2022/0416240 | A1* | 12/2022 | Seo | H01M 4/131 |
| 2023/0053984 | A1* | 2/2023 | Seo | H01M 4/505 |
| 2023/0197959 | A1* | 6/2023 | Dong | H01M 4/485 |
| | | | | 429/221 |
| 2024/0234707 | A1* | 7/2024 | Kim | H01M 4/505 |
| 2024/0274796 | A1* | 8/2024 | Zhou | H01M 4/131 |
| 2024/0282949 | A1* | 8/2024 | Zhou | H01M 4/505 |
| 2024/0363856 | A1* | 10/2024 | Li | H01M 4/5825 |

FOREIGN PATENT DOCUMENTS

| | | |
|---|---|---|
| CN | 1290209 C | 12/2006 |
| CN | 102637894 A | 8/2012 |
| CN | 104037418 A | 9/2014 |
| CN | 101877417 B | 8/2016 |
| CN | 106531984 A | 3/2017 |
| CN | 110265627 A | 9/2019 |
| CN | 110875499 A | 3/2020 |
| CN | 113410511 A | 9/2021 |
| CN | 113471514 A | 10/2021 |

(Continued)

OTHER PUBLICATIONS

Derwent Abstract of JP 2012-2044307 A (2012) (Year: 2012).*
Derwent Abstract of CN 104009228 A (2014) (Year: 2014).*
Derwent Abstract of CN 114744290 A (2022) (Year: 2022).*
International Search Report issued on Jul. 4, 2022, in corresponding International Application No. PCT/CN2022/076462, 7 pages.
Office Action issued on Apr. 24, 2025, in corresponding Chinese Application No. 202280002550.X, 14 pages.
Extended Search Report issued on Feb. 3, 2025, in corresponding European Application No. 22884909.7, 8 pages.
Office Action issued on Jul. 8, 2025, in corresponding Japanese Application No. 2024-524759, 8 pages.

*Primary Examiner* — Kevin M Bernatz
(74) *Attorney, Agent, or Firm* — Maier & Maier, PLLC

(57) ABSTRACT

An electrochemical device includes a positive electrode, a negative electrode, a separator, and an electrolyte solution. The positive electrode includes a positive active material layer. The positive active material layer includes a positive active material represented by Formula (1): $Li_{1+r}Ni_{1-p-q}M1_pM2_qO_{2-s}M3_s$ Formula (1). In Formula (1), $0 < r \leq 1$, $0 < p < 1$, $0 < q < 1$, $0 < p+q < 0.5$, $0 \leq s < 0.2$, M1 and M2 each are independently at least one of Co, Mn, Fe, Ti, Al, V, Cr, Nb, Zr, La, or Y, and M3 is at least one of S, N, F, Cl, or Br. A resistance of the positive electrode is R Ω. A compaction density of the positive electrode is P g/cm³. A single-side areal density of the positive electrode is Q g/1540.25 mm². The positive electrode satisfies Formula (2): $3.5 \leq R \cdot P/Q \leq 30$ Formula (2). The electrolyte solution includes fluoroethylene carbonate.

20 Claims, 1 Drawing Sheet

(56) References Cited

FOREIGN PATENT DOCUMENTS

| | | | |
|---|---|---|---|
| JP | 2012204307 A | * | 10/2012 |
| JP | 2018503962 A | | 2/2018 |
| JP | 2019505086 A | | 2/2019 |
| JP | 2020145128 A | | 9/2020 |
| KR | 1020200073552 A | | 6/2020 |
| KR | 1020200114403 A | | 10/2020 |
| WO | 2016123396 A1 | | 8/2016 |
| WO | 2019151724 A1 | | 8/2019 |

* cited by examiner

ELECTROCHEMICAL DEVICE AND ELECTRONIC DEVICE CONTAINING SAME

CROSS REFERENCE TO RELATED APPLICATION

This application is a continuation application of PCT/CN2022/076462, filed on Feb. 16, 2022, which claims priority of international application No. PCT/CN2021/126213, filed on Oct. 25, 2021, the disclosure of which is hereby incorporated by reference in its entirety.

TECHNICAL FIELD

This application relates to the technical field of energy storage, and in particular, to an electrochemical device and an electronic device containing same.

BACKGROUND

During a first charge-discharge cycle of a lithium-ion battery, a solid electrolyte interface (SEI) is formed on a surface of a negative electrode of the battery, thereby causing an irreversible loss of capacity, and in turn, reducing an energy density of a lithium-ion energy storage device. In a lithium-ion battery that uses graphite as an negative electrode material, the first charge-discharge cycle consumes approximately 10% of active lithium source. In a lithium-ion battery that uses a high-specific-capacity negative electrode material, for example, in a lithium-ion battery that uses an alloy (silicon or tin alloy or the like) negative electrode, an oxide (silicon oxide or tin oxide) negative electrode, or an amorphous carbon negative electrode, the depletion of the active lithium source during the first charge-discharge cycle is further exacerbated.

To compensate for the active lithium source depleted during the first charge-discharge cycle, researchers in this field have attempted to improve the lithium-ion battery by supplementing lithium in an negative electrode. For example, the Patent Grant Announcement No. CN1290209C discloses an negative electrode lithium supplementing method. The method is to mix metallic lithium powder, a negative electrode material, and a nonaqueous liquid to form a slurry, apply the slurry onto a negative electrode collector, and then perform steps such as drying, calendering, and electrolyte injection to complete assembling of an energy storage device. Although this method can improve the energy density of the lithium-ion battery, metallic lithium is extremely reactive and prone to react with moisture in the air. Therefore, the production process requires the use of a nonaqueous organic solvent that does not react with lithium, and requires strict control of moisture, thereby increasing difficulty of the process. FMC Corporation, a US-based company, has performed an improvement process for lithium powder. The stabilized lithium metal powder (SLMP) produced by FMC is of higher stability, but can stably exist in dry air for just a few hours. This time limit imposes harsh requirements on the production process of the lithium-ion battery (including slurry mixing, coating, oven-drying, cutting, calendering, winding, electrolyte injection, and the like). Moreover, the SLMP also imposes stringent requirements on the humidity and oxygen content of the operating environment. If the operation is performed by a dry method, the lithium powder is prone to float in the air, thereby posing safety hazards. If the operation is performed by a wet method, a nonaqueous solvent also needs to be selected and the moisture content needs to be controlled.

In view of the great challenges encountered by the negative electrode lithium supplementation policy, a positive electrode lithium supplementation method is safer and easier to operate, and has drawn more and more attention from the industry. For example, the Patent Publication No. CN104037418A discloses a positive electrode lithium-supplementing material based on a lithium-oxygen compound, a lithium source, and alkyl lithium. However, a decomposition potential of the lithium-oxygen compound in the material is relatively high, and the decomposition process generates oxygen and other by-products, thereby affecting the battery life. The patent grant announcement No. CN101877417B discloses a $Li_2NiO_2$ lithium-supplementing material. Such lithium-supplementing material is of a high specific capacity and prepared by a simple method, and can well supplement the active lithium. However, such lithium-supplementing material leaves residual inactive constituents on an electrode plate after first-cycle charging dilithiation, thereby being detrimental to further improvement of the energy density of the lithium-ion battery. In addition, during the first charging cycle, a large amount of active lithium is intercalated into the negative electrode, thereby leading to a further decrease in the true potential of the negative electrode. In addition, the solvent in an electrolyte solution continues a reduction reaction on the negative electrode, thereby resulting in a continuous increase in impedance, and in turn, affecting the cycle performance.

Therefore, how to achieve good cycle performance and C-rate performance in addition to a higher energy density of a lithium-ion battery is an important topic of research in the field of batteries.

SUMMARY

This application provides an electrochemical device in an attempt to solve at least one problem in the related art to at least some extent.

This application provides an electrochemical device. The electrochemical device includes a positive electrode, a negative electrode, a separator, and an electrolyte solution. The positive electrode includes a positive active material layer. The positive active material layer includes a positive active material represented by Formula (1): $Li_{1+r}Ni_{1-p-q}M1_pM2_qO_{2-s}M3_s$ Formula (1). In Formula (1), $0<r\leq1$, $0<p<1$, $0<q<1$, $0<p+q<0.5$, $0\leq s<0.2$, M1 and M2 each are independently at least one of Co, Mn, Fe, Ti, Al, V, Cr, Nb, Zr, La, or Y, and M3 is at least one of S, N, F, Cl, or Br. A resistance of the positive electrode is R Ω. A compaction density of the positive electrode is P g/cm³. A single-side areal density of the positive electrode is Q g/1540.25 mm². The positive electrode satisfies Formula (2):

$$3.5 \leq R \cdot P/Q \leq 30. \quad \text{Formula (2)}$$

The electrolyte solution includes fluoroethylene carbonate.

According to some embodiments of this application, the positive electrode further satisfies Formula (3):

$$5.0 \leq R \cdot P/Q \leq 12. \quad \text{Formula (3)}$$

According to some embodiments of this application, R satisfies: $R \leq 3$.

According to some embodiments of this application, R satisfies: R≤1.5.

According to some embodiments of this application, P satisfies: 2.8<P≤3.6.

According to some embodiments of this application, Q satisfies: 0.16<Q<0.32.

According to some embodiments of this application, based on a total mass of the electrolyte solution, a mass percent of fluoroethylene carbonate is greater than 0 and less than or equal to 15%.

According to some embodiments of this application, based on a total mass of the positive active material layer, a mass percent of the positive active material is 80% to 98%.

According to some embodiments of this application, the positive active material exhibits a phase A and a phase B. The phase A exhibits a characteristic diffraction peak A1 of a (003) crystal plane at 17° to 19°, and the phase B exhibits a characteristic diffraction peak B1 of a (001) crystal plane at 16° to 18°. An intensity $I_A$ of the characteristic diffraction peak A1 and an intensity $I_B$ of the characteristic diffraction peak B1 satisfy Formula (4):

$$0 \le I_A/I_B < 100. \qquad \text{Formula (4)}$$

This application further provides an electronic device. The electronic device includes any one of the electrochemical devices described above.

Additional aspects and advantages of this application will be partly described or illustrated herein later or expounded through implementation of an embodiment of this application.

BRIEF DESCRIPTION OF DRAWINGS

For ease of describing an embodiment of this application, the following outlines the drawings needed for describing an embodiment of this application or the prior art. Evidently, the drawings outlined below are merely a part of embodiments in this application. Without making any creative efforts, a person skilled in the art can still derive the drawings of other embodiments according to the structures illustrated in the drawings.

DETAILED DESCRIPTION

Figure 1:
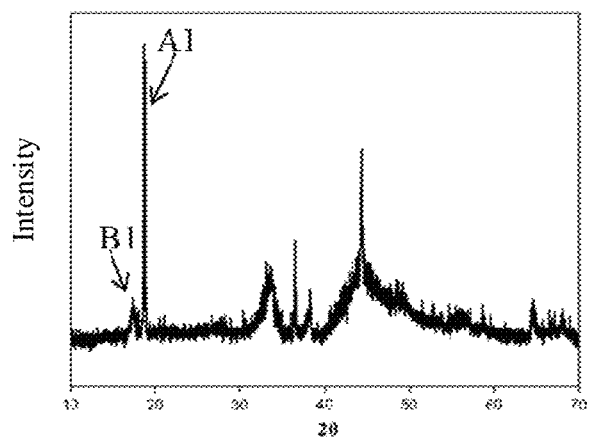
FIG. 1 shows an X-ray diffraction (XRD) pattern of a positive active material $Li_{1.2}Ni_{0.8}Co_{0.1}Mn_{0.1}O_2$ according to Embodiment 1 of this application.

Some embodiments of this application will be described in detail below. The embodiments described herein are illustrative in nature, and are intended to enable a basic understanding of this application. No embodiment of this application is to be construed as a limitation on this application.

The terms "roughly," "substantially," "substantively", and "approximately" used herein are intended to describe and represent small variations. When used together with an event or situation, the term "approximately" may represent an example in which the event or situation occurs exactly or an example in which the event or situation occurs very approximately. For example, when used together with a numerical value, the term "approximately" may represent a variation range falling within ±10% of the numerical value, such as ±5%, ±4%, ±3%, ±2%, ±1%, ±0.5%, ±0.1%, or ±0.05% of the numerical value. For example, if a difference between two numerical values falls within ±10% of an average of the numerical values (such as ±5%, ±4%, ±3%, ±2%, ±1%, ±0.5%, ±0.1%, or ±0.05% of the average), the two numerical values may be considered to be "substantially" the same.

In addition, a quantity, a ratio, or another numerical value herein is sometimes expressed in the format of a range. Understandably, such a range format is set out for convenience and brevity, and needs to be flexibly understood to include not only the numerical values explicitly specified and defined by the range, but also all individual numerical values or sub-ranges covered in the range as if each individual numerical value and each sub-range were explicitly specified.

In the embodiments and claims, a list of items recited by using the terms such as "at least one of", "at least one thereof", "at least one type of" or other similar terms may mean any combination of the recited items. For example, if items A and B are listed, the phrases "at least one of A and B" and "at least one of A or B" mean: A alone; B alone; or both A and B. In another example, if items A, B, and C are listed, the phrases "at least one of A, B, and C" and "at least one of A, B, or C" mean: A alone; B alone; C alone; A and B (excluding C); A and C (excluding B); B and C (excluding A); or all of A, B, and C. The item A may include a single element or a plurality of elements. The item B may include a single element or a plurality of elements. The item C may include a single element or a plurality of elements.

Some embodiments of this application relate to an electrochemical device. The electrochemical device includes a positive electrode, a negative electrode, a separator, and an electrolyte solution. In some embodiments, the electrochemical device is a lithium-ion battery.

The electrochemical device of this application exhibits advantages such as a high energy density, good C-rate performance, and a long cycle life. On the one hand, the positive electrode in the electrochemical device of this application includes a nickel-based positive active material. The nickel-based positive active material exhibits a relatively high first-charge specific capacity, and can supplement active lithium consumed by the generation of a solid electrolyte interface (SEI), thereby increasing the energy density of the electrochemical device. On the other hand, the electrolyte solution in the electrochemical device of this application includes fluoroethylene carbonate, and can make the negative electrode form a more homogeneous and denser SEI film while supplementing lithium in the positive electrode, thereby reducing continuous depletion of active lithium. On another hand, the resistance, compaction density, and single-side areal density of the positive electrode in the electrochemical device of this application satisfy specified design requirements, thereby significantly improving the cycle life and C-rate performance of the electrochemical device.

I. Electrochemical Device

This application provides an electrochemical device. The electrochemical device includes a positive electrode, a negative electrode, a separator, and an electrolyte solution. The positive electrode includes a positive active material layer. The positive active material layer includes a positive active material represented by Formula (1):

$$Li_{1+r}Ni_{1-p-q}M1_pM2_qO_{2-s}M3_s \qquad \text{Formula (1)}$$

In Formula (1), 0<r≤1, 0<p<1, 0<q<1, 0<p+q<0.5, 0≤s<0.2, M1 and M2 each are independently at least one of Co, Mn, Fe, Ti, Al, V, Cr, Nb, Zr, La, or Y, and M3 is at least one of S, N, F, Cl, or Br. A resistance of the positive electrode is R Ω. A compaction density of the positive electrode is P g/cm$^3$. A single-side areal density of the positive electrode is Q g/1540.25 mm$^2$. The positive electrode satisfies Formula (2):

$$3.5 \leq R \cdot P/Q \leq 30 \qquad \text{Formula (2)}$$

The electrolyte solution includes fluoroethylene carbonate.

The positive active material $Li_{1+r}Ni_{1-p-q}M1_pM2_qO_{2-s}M3_s$ exhibits two phases: a phase A and a phase B. The phase A (such as lithium nickel cobalt manganese oxide (NCM)) belongs to an R-3m space group, and may serve as a positive active material of a high specific capacity. The phase B (such as over-lithiated NCM) belongs to an F-3m1 space group, and exhibits a very high specific capacity, and can release a large amount of lithium ions during the first charge to supplement active lithium, so as to make up for the loss of the active lithium caused by the formation of the SEI. The phase B transforms into the phase A after dilithiation, and serves as a positive active material to participate in the subsequent charge-discharge cycle.

In some embodiments, the phase A exhibits a characteristic diffraction peak A1 of the (003) crystal plane at 17° to 19°, and the phase B exhibits a characteristic diffraction peak B1 of the (001) crystal plane at 16° to 18°. An intensity $I_A$ of the characteristic diffraction peak A1 and an intensity $I_B$ of the characteristic diffraction peak B1 satisfy Formula (4):

$$0 \leq I_A/I_B < 100. \qquad \text{Formula (4)}$$

In some embodiments, the $I_A/I_B$ ratio is approximately 0, approximately 0.01, approximately 0.05, approximately 0.1, approximately 0.13, approximately 0.15, approximately 0.2, approximately 0.5, approximately 1, approximately 5, approximately 10, approximately 15, approximately 20, approximately 25, approximately 30, approximately 35, approximately 40, approximately 45, approximately 50, approximately 55, approximately 60, approximately 65, approximately 70, approximately 75, approximately 80, approximately 85, approximately 90, approximately 95, approximately 99, or a value falling within a range formed by any two thereof. For example, the range is approximately 0.01 to approximately 0.2, approximately 0.01 to approximately 10, approximately 0.1 to approximately 50, 0 to approximately 50, or approximately 0.1 to approximately 100.

The specific capacity of the positive active material $Li_{1+r}Ni_{1-p-q}M1_pM2_qO_{2-s}M3_s$ depends on the value of r in $Li_{1+r}Ni_{1-p-q}M1_pM2_qO_{2-s}M3_s$. A larger value of r represents a higher degree of over-lithiation, and a higher first-charge specific capacity. In some embodiments, the mass percent of nickel in the positive active material $Li_{1+r}Ni_{1-p-q}M1_pM2_qO_{2-s}M3_s$ is more than 50%.

In some embodiments, in the positive active material, s is equal to 0, M1 is Co, M2 is at least one of Mn or Al. For example, the positive active material is $Li_{1.2}Ni_{0.8}Co_{0.1}Mn_{0.1}O_2$, $Li_{1.2}Ni_{0.6}Co_{0.2}Mn_{0.2}O_2$, or $Li_{1.2}Ni_{0.8}Co_{0.08}Mn_{0.1}Al_{0.02}O_2$.

In some embodiments, in the positive active material, M1 is Co, M2 is Mn, and M3 is at least one of F or S. For example, the positive active material is $Li_{1.2}Ni_{0.8}Co_{0.1}Mn_{0.1}O_{1.95}F_{0.05}$ or $Li_{1.2}Ni_{0.8}Co_{0.1}Mn_{0.1}O_{1.9}S_{0.05}F_{0.05}$.

In some embodiments, the positive electrode includes a positive current collector. The positive current collector includes two surfaces opposite to each other in a thickness direction of the current collector. The positive active material layer is disposed on at least one surface of the positive current collector. The positive active material layer includes a positive active material shown in Formula (1).

In some embodiments, based on a total mass of the positive active material layer, a mass percent of the positive active material is approximately 80% to approximately 98%. In some embodiments, based on the total mass of the positive active material layer, the mass percent of the positive active material is approximately 80%, approximately 82%, approximately 84%, approximately 86%, approximately 88%, approximately 90%, approximately 92%, approximately 94%, approximately 96%, approximately 98%, or a value falling within a range formed by any two thereof. For example, the range is approximately 80% to approximately 85%, approximately 80% to approximately 90%, approximately 85% to approximately 95%, or approximately 90% to approximately 98%.

The resistance (R Ω) of the positive electrode is a film resistance, and can be measured by a direct-current two-probe method. The compaction density (P g/cm$^3$) of the positive electrode may be calculated by a formula P=m/v, where m is the mass of the positive active material layer, in units of g, and v is the volume of the positive active material layer, in the units of cm$^3$. The volume v of the positive active material layer may be a product of the area Ar of the positive active material layer and the thickness of the positive active material layer. The single-side areal density (Q g/1540.25 mm$^2$) of the positive electrode may be calculated by a formula Q=1540.25 m/Ar, where m is the mass of the positive active material layer, in units of g, and Ar is the area of the positive active material layer, in the units of mm$^2$.

In this application, the resistance, compaction density, and single-side areal density of the positive electrode are key parameters for design and preparation of the electrochemical device. An unduly high resistance of the positive electrode deteriorates the cycle performance and C-rate performance of the electrochemical device. An unduly high or low compaction density deteriorates the cycle performance and C-rate performance of the electrochemical device. An unduly large a single-side areal density of the positive electrode reduces the cycle life of the electrochemical device, and impedes permeation of the electrolyte solution, thereby deteriorating the C-rate performance of the electrochemical device, and especially reducing the discharge capacity of the electrochemical device cycled at a C-rate performance. However, an unduly low single-side areal density of the positive electrode means increased lengths of the current collector and separator for achieving the same battery capacity, thereby increasing the ohmic internal resistance of the electrochemical device. Through research, the applicant hereof finds that such parameters may be designed comprehensively during preparation of the electrochemical device to make the positive electrode satisfy Formula (2), and in turn, effectively improve the cycle performance and C-rate performance of the electrochemical device.

In some embodiments, R·P/Q may be approximately 3.5, approximately 3.7, approximately 3.8, approximately 5, approximately 5.5, approximately 6, approximately 6.5, approximately 7, approximately 7.5, approximately 8, approximately 8.5, approximately 9, approximately 9.5, approximately 10, approximately 10.5, approximately 11, approximately 11.5, approximately 12, approximately 13, approximately 14, approximately 15, approximately 18, approximately 19, approximately 20, approximately 22, approximately 25, approximately 28, approximately 29, approximately 30, or a value falling within a range formed by any two thereof. For example, the range is approximately 3.5 to approximately 10, approximately 3.7 to approximately 9, approximately 5 to approximately 8, approximately 5 to approximately 10, approximately 5 to approximately 15, approximately 8 to approximately 12, approximately 10 to approximately 12, approximately 10 to approximately 20, approximately 10 to approximately 30, approximately 15 to approximately 30, or approximately 20 to approximately 30.

In some embodiments, the positive electrode further satisfies the following Formula (3):

$$5.0 \leq R \cdot P/Q \leq 12. \quad \text{Formula (3)}$$

For example, R·P/Q may be approximately 5, approximately 5.5, approximately 6, approximately 6.5, approximately 7, approximately 7.5, approximately 8, approximately 8.5, approximately 9, approximately 9.5, approximately 10, approximately 10.5, approximately 11, approximately 11.5, approximately 12, or a value falling within a range formed by any two thereof. For example, the range is approximately 5 to approximately 8, approximately 5 to approximately 10, approximately 8 to approximately 12, or approximately 10 to approximately 12.

In some embodiments, the resistance of the positive electrode is less than or equal to 3Ω (that is, R≤3), thereby favorably improving the cycle performance and C-rate performance of the electrochemical device. R may be any value or in any range less than or equal to 3. For example, R may be less than or equal to 2.8, less than or equal to 2.5, less than or equal to 2, less than or equal to 1.5, less than or equal to 1.4, less than or equal to 1.3, less than or equal to 1.2, less than or equal to 1, less than or equal to 0.8, less than or equal to 0.6, less than or equal to 0.5, less than or equal to 0.4, or less than or equal to 0.3; or, R may be approximately 3, approximately 2.8, approximately 2.5, approximately 2, approximately 1.8, approximately 1.5, approximately 1.2, approximately 1, approximately 0.8, approximately 0.6, approximately 0.5, approximately 0.3, approximately 0.1, or a value falling within a range formed by any two thereof. For example, the range is approximately 0.1 to approximately 1, approximately 0.5 to approximately 1, approximately 0.4 to approximately 1.5, approximately 0.6 to approximately 1.5, approximately 0.5 to approximately 1.5, approximately 1 to approximately 2, approximately 0.5 to approximately 3, or approximately 1.5 to approximately 3. In some embodiments, a resistance of the positive electrode is less than or equal to 1.5Ω (that is, R≤1.5).

In some embodiments, a compaction density of the positive electrode is greater than 2.8 g/cm³ and less than or equal to 3.6 g/cm³, that is, 2.8<P≤3.6. P may be any value or in any range greater than 2.8 and less than or equal to 3.6. For example, P may be greater than 2.8 and less than or equal to 3.0, greater than 2.8 and less than or equal to 3.5, greater than or equal to 3.0 and less than or equal to 3.3, greater than or equal to 3.0 and less than or equal to 3.6, or, greater than or equal to 3.2 and less than or equal to 3.6; or, P may be approximately 2.85, approximately 2.9, approximately 3.0, approximately 3.1, approximately 3.2, approximately 3.3, approximately 3.4, approximately 3.5, approximately 3.6, or a value falling within a range formed by any two thereof. For example, the range is approximately 2.9 to approximately 3.3, approximately 3.0 to approximately 3.5, or approximately 2.9 to approximately 3.6. Controlling the compaction density of the positive electrode to fall within the above ranges facilitates the migration of electrons and ions in the positive electrode, thereby improving the cycle performance of the electrochemical device.

In some embodiments, a single-side areal density of the positive electrode is greater than 0.16 g/1540.25 mm² and less than 0.32 g/1540.25 mm² (that is, 0.16<Q<0.32), so as to improve the cycle performance and C-rate performance of the electrochemical device while ensuring a high charge/discharge capacity. Q may be any value or in any range greater than 0.16 and less than 0.32. For example, Q may be greater than 0.16 and less than 0.30, greater than 0.16 and less than 0.28, greater than 0.16 and less than 0.25, greater than 0.16 and less than 0.20, greater than or equal to 0.20 and less than 0.32, greater than or equal to 0.25 and less than 0.32, greater than or equal to 0.30 and less than 0.32, or Q may be approximately 0.17, approximately 0.18, approximately 0.19, approximately 0.20, approximately 0.21, approximately 0.22, approximately 0.23, approximately 0.24, approximately 0.25, approximately 0.26, approximately 0.27, approximately 0.28, approximately 0.29, approximately 0.30, approximately 0.31, or a value falling within a range formed by any two thereof. For example, the range is approximately 0.17 to approximately 0.31, approximately 0.18 to approximately 0.31, approximately 0.20 to approximately 0.31, or approximately 0.25 to approximately 0.30.

Further, by adding fluoroethylene carbonate into the electrolyte solution, this application causes a LiF-rich, uniform and dense SEI film to be formed on the negative electrode, thereby effectively suppressing continuous loss of active lithium. At the same time, the fluoroethylene carbonate is more resistant to high-voltage oxidation on the positive electrode side, thereby further increasing the cycle life of the electrochemical device.

In some embodiments, based on a total mass of the electrolyte solution, a mass percent of fluoroethylene carbonate is greater than 0 and less than or equal to 15%. In some embodiments, based on the total mass of the electrolyte solution, the mass percent of the fluoroethylene carbonate may be any value or in any range greater than 0 and less than or equal to 15%. For example, the mass percent of the fluoroethylene carbonate may be approximately 0.1%, approximately 0.5%, approximately 1.0%, approximately 2.0%, approximately 3.0%, approximately 4.0%, approximately 5.0%, approximately 6.0%, approximately 7.0%, approximately 8.0%, approximately 9.0%, approximately 10.0%, approximately 11.0%, approximately 12.0%, approximately 13.0%, approximately 14.0%, approximately 15.0%, or a value falling within a range formed by any two thereof. For example, the range is approximately 0.1% to approximately 15.0%, approximately 0.5% to approximately 15.0%, approximately 1% to approximately 15.0%, approximately 5% to approximately 10.0%, approximately 5% to approximately 15.0%, or approximately 10% to approximately 15.0%.

The electrochemical device of this application achieves concurrent superiority of energy density, C-rate performance, and cycle life by containing a nickel-based positive active material of a high specific capacity and fluoroethylene carbonate and adjusting the resistance, compaction density, and single-side areal density of the positive electrode.

In some embodiments, the positive active material layer further includes a binder. The binder strengthens bonding between particles of the positive active material, and strengthens bonding between the positive active material and a positive current collector.

In some embodiments, the binder includes, but is not limited to, at least one of styrene-butadiene rubber (SBR), water-based acrylic resin, carboxymethyl cellulose (CMC), polyvinylidene difluoride (PVDF), polytetrafluoroethylene (PTFE), polyvinyl butyral (PVB), poly(ethylene-co-vinyl acetate) (EVA), or polyvinyl alcohol (PVA). The binder may be selected as actually required.

In some embodiments, based on the total mass of the positive active material layer, the mass percent of the binder is less than or equal to 2.0%, so as to achieve a relatively low positive electrode film resistance. In some embodiments, based on the total mass of the positive active material layer, the mass percent of the binder is approximately 2.0%, approximately 1.8%, approximately 1.5%, approximately 1.2%, approximately 1.0%, approximately 0.8%, approximately 0.5%, approximately 0.3%, approximately 0.1%, or a value falling within a range formed by any two thereof. For example, the range is approximately 0.1% to approximately 2.0%, approximately 0.5% to approximately 2.0%, approximately 0.1% to approximately 1.0%, or approximately 1.0% to approximately 2.0%.

In some embodiments, the positive active material layer further includes a conductive agent. The conductive agent includes, but is not limited to, at least one of graphite, superconductive carbon, acetylene black, carbon black, Ketjen black, carbon dots, carbon nanotubes, graphene, or carbon nanofibers. The conductive agent may be selected as actually required.

In some embodiments, based on the total mass of the positive active material layer, the mass percent of the conductive agent is greater than or equal to 0.5%, so as to achieve a relatively low positive electrode film resistance. In some embodiments, based on the total mass of the positive active material layer, the mass percent of the conductive agent is greater than or equal to 0.5%, greater than or equal to 1.0%, greater than or equal to 1.5%, or the like.

In some embodiments, the positive current collector may be, but is not limited to, a metal foil or a porous metal sheet, for example, a foil or porous sheet of metals such as aluminum, copper, nickel, titanium, or silver, or an alloy thereof, such as aluminum foil.

In some embodiments, the thickness of the positive current collector is approximately 5 μm to approximately 20 μm, for example, approximately 5 μm, approximately 6 μm, approximately 7 μm, approximately 8 μm, approximately 10, approximately 12 μm, approximately 14 μm, approximately 16 μm, approximately 18 μm, approximately 20 μm, or a value falling within a range formed by any two thereof. For example, the range is approximately 6 μm to 18 μm, or approximately 8 μm to approximately 16 μm.

In some embodiments, the positive active material layer may be made by performing the following operations: dry-mixing the positive active material and the binder (as necessary, in addition to a conductive material and a thickener) and making the mixture into a sheet, and crimping the obtained sheet onto the positive current collector; or, dissolving or dispersing such materials into a liquid medium to form a slurry, coating the positive current collector with the slurry, and drying the slurry.

In some embodiments, the positive electrode may be prepared by a preparation method known in the art. For example, the positive electrode may be obtained by the following method: mixing a positive active material, a conductive material, and a binder in a solvent to prepare an active material composite, and coating the positive current collector with the active material composite. In some embodiments, the solvent may include, but is not limited to, N-methyl-pyrrolidone (NMP).

In some embodiments, the negative electrode may be a metal lithium sheet, or may include a negative current collector and a negative active material layer disposed on at least one surface of the negative current collector.

In some embodiments, the negative active material layer includes a negative active material, and optionally includes a conductive agent, a binder, and a thickener.

In some embodiments, the negative active material may include one or more of natural graphite, artificial graphite, mesocarbon microbead (MCMB), hard carbon, soft carbon, silicon, a silicon-carbon composite, SiO, a Li—Sn alloy, a Li—Sn—O alloy, Sn, SnO, $SnO_2$, spinel-structured lithium titanium oxide $Li_4Ti_5O_{12}$, a Li—Al alloy, or metallic lithium.

In some embodiments, the conductive agent may include one or more of graphite, superconductive carbon, acetylene black, carbon black, Ketjen black, carbon dots, carbon nanotubes, graphene, or carbon nanofibers.

In some embodiments, the binder may be one or more of styrene-butadiene rubber, polyvinylidene difluoride, polytetrafluoroethylene, polyvinyl butyral, water-based acrylic resin, carboxymethyl cellulose, or polyacrylic acid (PAA).

In some embodiments, the thickener may be carboxymethyl cellulose.

The negative electrode in the electrochemical device of this application is not limited to the above materials. Other materials suitable for use as a negative active material, a conductive agent, a binder, or a thickener of a lithium-ion battery may also be applied herein.

The negative current collector may be made of a metal foil or a porous metal sheet or another material, for example, a foil or porous plate made of metal such as copper, nickel, titanium, or iron, or an alloy thereof, such as a copper foil.

The negative electrode may be prepared by a conventional method in this field. Typically, a method for preparing the negative electrode plate includes: dispersing the negative active material and optionally the conductive agent, the binder, and the thickener in a solvent such as N-methyl-pyrrolidone or deionized water to form a homogeneous negative slurry, coating a negative current collector with the negative slurry, and performing steps such as drying and cold pressing to obtain a negative electrode plate.

The separator in the electrochemical device of this application is not particularly limited, and may be any well-known porous-structured separator that is electrochemically stable and chemically stable, for example, may be a single-layer or multi-layer film that is one or more of glass fiber, non-woven fabric, polyethylene (PE), polypropylene (PP), and polyvinylidene difluoride.

The electrolyte solution in the electrochemical device of this application includes an organic solvent, an electrolyte lithium salt, and an additive in addition to the fluoroethylene carbonate. The types of the organic solvent and the electrolyte salt are not particularly limited herein, and may be selected as actually required.

In some embodiments, the organic solvent may be at least one of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), vinylene carbonate (VC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methyl sulfone (EMS), or (ethylsulfonyl) ethane (ESE). In some embodiments, the organic solvent includes at least two of the above compounds.

In some embodiments, the electrolyte lithium salt may be one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bisfluorosulfonimide (LiFSI), lithium bistrifluoromethanesulfonimide (LiTFSI), lithium trifluoromethanesulfonate (LiTFS), lithium difluoro(oxalato) borate (LiDFOB), lithium bis(oxalato)borate (LiBOB), lithium difluorophosphate ($LiPO_2F_2$), lithium difluoro(bisoxalato)phosphate (LiDFOP), or lithium tetrafluoro(oxalato)phosphate (LiTFOP).

In some embodiments, the electrolyte solution further optionally includes other additives. The types of other additives may be any additives suitable for use in a lithium-ion battery, and may be selected as actually required, without being particularly limited herein. In some embodiments, the additive may be one or more of vinyl ethylene carbonate (VEC), succinonitrile (SN), adiponitrile (AND), 1,3-propene sultone (PST), sulfonate cyclic quaternary ammonium salt, tris(trimethylsilane)phosphate (TMSP), or tris(trimethylsilane)borate (TMSB).

The electrolyte solution in the electrochemical device of this application may be prepared by a conventional method in this field. For example, the electrolyte solution may be obtained by mixing well an organic solvent, an electrolyte salt, fluoroethylene carbonate, and another optional additive. The sequence of the constituents added is not particularly limited herein. For example, the electrolyte solution may be obtained by adding an electrolyte lithium salt, fluoroethylene carbonate, and another optional additive into an organic solvent and mixing the mixture well. The electrolyte lithium salt may be added into the organic solvent first, and then the fluoroethylene carbonate and another optional additive are separately or simultaneously added into the organic solvent.

The electrochemical device of this application may be prepared by a conventional method in this field. For example, a battery cell may be obtained by stacking the positive electrode, the separator, and the negative electrode in sequence in such a way that the separator is located between the positive electrode and the negative electrode to serve a function of separation, or may be obtained by winding the stacked structure; and the battery cell is put into a packaging shell, and the packaging shell is filled with an electrolyte solution and sealed to obtain an electrochemical device.

II. Electronic Device

The electrochemical device described in this application is applicable to electronic devices in various fields.

The electrochemical device according to this application may be used for purposes not particularly limited, and may be used for any purpose known in the prior art. In an embodiment, the electrochemical device according to this application is applicable to, but without being limited to, a notebook computer, pen-inputting computer, mobile computer, e-book player, portable phone, portable fax machine, portable photocopier, portable printer, stereo headset, video recorder, liquid crystal display television set, handheld cleaner, portable CD player, mini CD-ROM, transceiver, electronic notepad, calculator, memory card, portable voice recorder, radio, backup power supply, motor, automobile, motorcycle, power-assisted bicycle, bicycle, lighting appliance, toy, game console, watch, electric tool, flashlight, camera, large household battery, lithium-ion capacitor, and the like.

III. Embodiments

The following describes this application in further detail with reference to embodiments and comparative embodiments. However, to the extent not departing from the essence of this application, this application is not limited to such embodiments.

Preparing a Lithium-Ion Battery (1) Preparing a Positive Electrode

Mixing the positive active material, polyvinylidene difluoride as a binder, and conductive carbon black, where the mass ratio between the positive active material, the polyvinylidene difluoride, and the conductive carbon black is 97.6:1.3:1.1. Adding an NMP solvent, stirring the solution with a vacuum mixer until a homogeneous state to obtain a positive electrode slurry. Applying the positive electrode slurry evenly onto a positive current collector aluminum foil, moving the current collector into an oven for drying at 120° C., and then performing steps such as cold-pressing and cutting to obtain a positive electrode.

(2) Preparing a Negative Electrode

Mixing artificial graphite as a negative active material, silicon suboxide, polyacrylic acid as a binder, and conductive carbon black at a mass ratio of 85.9:10:2.8:1.3, adding deionized water as a solvent, and stirring the solution with a vacuum mixer to obtain a negative electrode slurry. Applying the negative electrode slurry evenly onto a negative current collector copper foil, moving the current collector into an oven for drying at 120° C., and then performing steps such as cold-pressing and cutting to obtain a negative electrode.

(3) Preparing an Electrolyte Solution

Mixing ethylene carbonate, ethyl methyl carbonate, and diethyl carbonate at a volume ratio of 1:1:1 and stirring the mixture well to obtain an organic solvent. Dissolving 1 mol/L $LiPF_6$ in the organic solvent, and then adding a specified amount of fluoroethylene carbonate, and stirring well to obtain an electrolyte solution.

(4) Preparing a Separator

Using a 14 μm-thick polypropylene film (manufactured by Celgard) as a separator.

(5) Preparing a Lithium-Ion Battery

Stacking the positive electrode, the separator, and the negative electrode in sequence, letting the separator be located between the positive electrode and the negative electrode to serve a separation function, winding them to obtain a bare cell, placing the bare cell into an outer package foil made of an aluminum plastic film, injecting the prepared electrolyte solution into the cell that is dried, and performing steps such as vacuum sealing, static standing, chemical formation, and shaping to complete preparing a lithium-ion battery.

Performing the foregoing preparation method to prepare the lithium-ion batteries in Embodiments 1 to 21 and Comparative Embodiments 1 to 5, and performing the following test on the prepared lithium-ion batteries. The positive active material, the resistance of the positive electrode, the compaction density of the positive electrode, the single-side areal density of the positive electrode, and the mass percent of the fluoroethylene carbonate relative to the total mass of the electrolyte solution in each embodiment and each comparative embodiment are shown in Table 1 below. In Comparative Embodiment 5, the positive active material is $LiNi_{0.8}Co_{0.1}Mn_{0.1}O_2$, and other parameters are identical to those in Embodiment 2. In the high-temperature cycle performance test below, the first-charge curves of Embodiment 2 and Comparative Embodiment 5 are plotted.

battery at a constant current of 1 C until the voltage reaches 3.0 V, thereby completing one charge-discharge cycle. Repeating the foregoing method to cycle the lithium-ion battery. Recording the first-cycle discharge capacity and the discharge capacity of the lithium-ion battery in each subsequent cycle until the discharge capacity of the lithium-ion battery fades to 80% of the first-cycle discharge capacity. Recording the number of charge-discharge cycles at this time.

(3) Testing the C-Rate Performance

Charging a lithium-ion battery at a constant current rate of 0.2 C at 25° C. until the voltage reaches 4.3 V, and then charging the battery at a constant voltage of 4.3 V until the

TABLE 1

| | Positive active material | $I_A/I_B$ | Resistance of positive electrode R (Ω) | Compaction density of positive electrode P (g/cm$^3$) | Single-side areal density of positive electrode Q (g/1540.25 mm$^2$) | Mass percent of floroethylene carbonate (%) |
|---|---|---|---|---|---|---|
| Comparative Embodiment 1 | $Li_{1.2}Ni_{0.8}Co_{0.1}Mn_{0.1}O_2$ | 7.2 | 3.5 | 3.65 | 0.20 | 5 |
| Comparative Embodiment 2 | $Li_{1.2}Ni_{0.8}Co_{0.1}Mn_{0.1}O_2$ | 7.2 | 3.1 | 2.7 | 0.22 | 5 |
| Comparative Embodiment 3 | $Li_{1.2}Ni_{0.8}Co_{0.1}Mn_{0.1}O_2$ | 7.2 | 0.1 | 2.8 | 0.40 | 5 |
| Comparative Embodiment 4 | $Li_{1.2}Ni_{0.8}Co_{0.1}Mn_{0.1}O_2$ | 7.2 | 0.6 | 3.5 | 0.24 | 0 |
| Comparative Embodiment 5 | $LiNi_{0.8}Co_{0.1}Mn_{0.1}O_2$ | ∞ | 0.6 | 3.5 | 0.24 | 5 |
| Embodiment 1 | $Li_{1.2}Ni_{0.8}Co_{0.1}Mn_{0.1}O_2$ | 7.2 | 0.6 | 3.5 | 0.24 | 20 |
| Embodiment 2 | $Li_{1.2}Ni_{0.8}Co_{0.1}Mn_{0.1}O_2$ | 7.2 | 0.6 | 3.5 | 0.24 | 5 |
| Embodiment 3 | $Li_{1.2}Ni_{0.8}Co_{0.1}Mn_{0.1}Al_{0.02}O_2$ | 6.4 | 0.6 | 3.5 | 0.24 | 5 |
| Embodiment 4 | $Li_{1.2}Ni_{0.8}Co_{0.1}Mn_{0.1}O_{1.95}F_{0.05}$ | 5.6 | 0.6 | 3.5 | 0.24 | 5 |
| Embodiment 5 | $Li_{1.2}Ni_{0.8}Co_{0.1}Mn_{0.1}O_{1.9}S_{0.05}F_{0.05}$ | 5.1 | 0.6 | 3.5 | 0.24 | 5 |
| Embodiment 6 | $Li_{1.2}Ni_{0.8}Co_{0.2}Mn_{0.2}O_2$ | 7.2 | 0.6 | 3.5 | 0.24 | 5 |
| Embodiment 7 | $Li_{1.2}Ni_{0.8}Co_{0.1}Mn_{0.1}O_2$ | 0 | 0.6 | 3.5 | 0.24 | 5 |
| Embodiment 8 | $Li_{1.2}Ni_{0.8}Co_{0.1}Mn_{0.1}O_2$ | 7.2 | 0.4 | 2.9 | 0.31 | 5 |
| Embodiment 9 | $Li_{1.2}Ni_{0.8}Co_{0.1}Mn_{0.1}O_2$ | 7.2 | 1.5 | 3.6 | 0.18 | 5 |
| Embodiment 10 | $Li_{1.2}Ni_{0.8}Co_{0.1}Mn_{0.1}O_2$ | 7.2 | 0.6 | 3.5 | 0.24 | 3 |
| Embodiment 11 | $Li_{1.2}Ni_{0.8}Co_{0.1}Mn_{0.1}O_2$ | 7.2 | 0.6 | 3.5 | 0.24 | 15 |
| Embodiment 12 | $Li_{1.2}Ni_{0.8}Co_{0.1}Mn_{0.1}O_2$ | 7.2 | 3.1 | 2.9 | 0.31 | 5 |
| Embodiment 13 | $Li_{1.2}Ni_{0.8}Co_{0.1}Mn_{0.1}O_2$ | 7.2 | 2.0 | 2.9 | 0.31 | 5 |
| Embodiment 14 | $Li_{1.2}Ni_{0.8}Co_{0.1}Mn_{0.1}O_2$ | 7.2 | 0.6 | 2.7 | 0.24 | 5 |
| Embodiment 15 | $Li_{1.2}Ni_{0.8}Co_{0.1}Mn_{0.1}O_2$ | 7.2 | 0.6 | 3.7 | 0.24 | 5 |
| Embodiment 16 | $Li_{1.2}Ni_{0.8}Co_{0.1}Mn_{0.1}O_2$ | 7.2 | 0.6 | 3.5 | 0.16 | 5 |
| Embodiment 17 | $Li_{1.2}Ni_{0.8}Co_{0.1}Mn_{0.1}O_2$ | 7.2 | 0.6 | 3.5 | 0.32 | 5 |
| Embodiment 18 | $Li_{1.01}Ni_{0.8}Co_{0.1}Mn_{0.1}O_2$ | 99.1 | 0.6 | 3.5 | 0.24 | 5 |
| Embodiment 19 | $Li_{1.02}Ni_{0.8}Co_{0.1}Mn_{0.1}O_2$ | 48.7 | 0.6 | 3.5 | 0.24 | 5 |
| Embodiment 20 | $Li_{1.05}Ni_{0.8}Co_{0.1}Mn_{0.1}O_2$ | 22.6 | 0.6 | 3.5 | 0.24 | 5 |
| Embodiment 21 | $Li_{1.5}Ni_{0.8}Co_{0.1}Mn_{0.1}O_2$ | 1.7 | 0.6 | 3.5 | 0.24 | 5 |

Test Methods (1) Measuring the Resistance of a Positive Electrode

Measuring the resistance of a positive electrode by using a Hioki BT3562 resistance tester. The specific measurement steps include: Gripping the positive electrode between two conductive terminals of the internal resistance tester, applying a pressure to fix the electrode plate, and measuring the resistance R of the positive electrode under the following test conditions: the contact area between the probe and the positive electrode plate is 49 π mm$^2$, the diameter of the conductive terminals is 14 mm, the applied pressure is 15 MPa to 27 MPa, and the sampling time range is 5 s to 17 s.

(2) Testing High-Temperature Cycle Performance

Putting a prepared lithium-ion battery in a 45° C. thermostat, charging the lithium-ion battery at a constant current of 1.5 C until the voltage reaches 4.3 V, and then charging the battery at a constant voltage of 4.3 V until the current is less than or equal to 0.05 C. Subsequently, discharging the current is less than or equal to 0.05 C, and then discharging the battery at a constant current rate of 0.2 C until the voltage reaches 3.0 V, and recording the 0.2 C-rate discharge capacity.

Charging the lithium-ion battery at a constant current rate of 0.2 C at 25° C. until the voltage reaches 4.3 V, and then charging the battery at a constant voltage of 4.3 V until the current is less than or equal to 0.05 C, and then discharging the battery at a constant current rate of 2 C until the voltage reaches 3.0 V, and recording the 2 C-rate discharge capacity.

2 C-rate discharge capacity retention rate of the lithium-ion battery (%)=2 C-rate discharge capacity/0.2 C-rate discharge capacity×100%.

(4) X-Ray Diffraction Test

Performing the test by using an X-ray diffractometer (manufactured by XPertPro MPD, the Netherlands) under the following test conditions: the radiation source is Cu Kα (λ=1.5418 Å), the operating current is 250 mA, the scanning is continuous, the operating voltage is 40 kV, the 2θ angle scanning range is 10° to 70°, the step length is 0.1°, the scanning speed is 0.2 s/step, and a diffraction test is performed on the specimen powder in each embodiment to check the phase of the specimen.

Test Results

FIG. 1 shows an X-ray diffraction (XRD) pattern of a positive active material $Li_{1.2}Ni_{0.8}Co_{0.1}Mn_{0.1}O_2$ according to Embodiment 1 of this application. The ratio of the intensity $I_A$ of the characteristic diffraction peak A1 of the (003) crystal plane at 17° to 19° to the intensity $I_B$ of the characteristic diffraction peak B1 of the (001) crystal plane at 16° to 18° is $I_A/I_B=7.2$.

Figure 2:
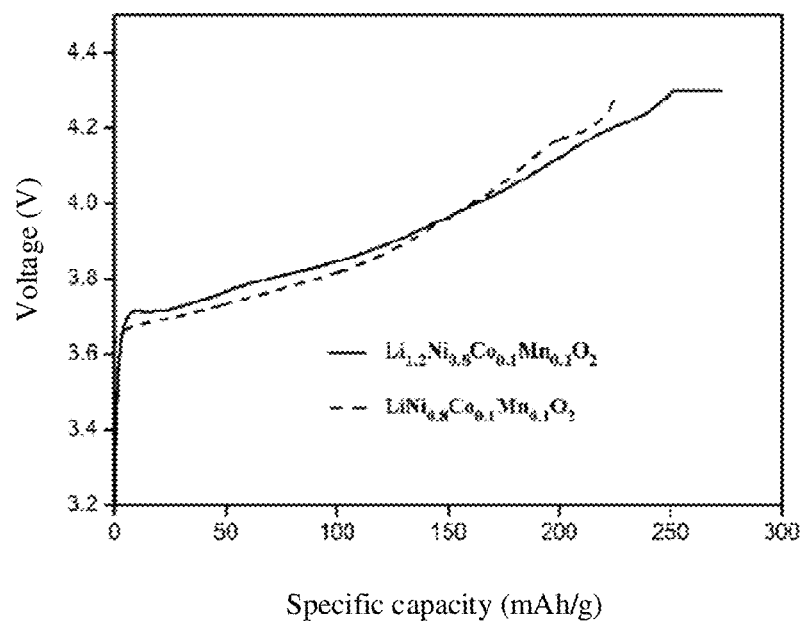
FIG. 2 shows a first-charge curve according to Embodiment 2 versus Comparative Embodiment 5 of this application.

FIG. 2 shows a first-charge curve according to Embodiment 2 versus Comparative Embodiment 5. As can be seen from FIG. 2, the first-charge specific capacity of the positive active material in this application is high, and can effectively compensate for the loss of active lithium caused by the generation of the SEI, thereby increasing the energy density of the lithium-ion battery.

Table 2 shows the test results of the lithium-ion batteries in Embodiments 1 to 21 and Comparative Embodiments 1 to 5.

TABLE 2

| | R · P/Q | Number of high-temperature cycles | 2 C-rate discharge capacity retention rate (%) |
|---|---|---|---|
| Comparative Embodiment 1 | 63.88 | 266 | 96.5 |
| Comparative Embodiment 2 | 38.05 | 282 | 96.7 |
| Comparative Embodiment 3 | 0.7 | 231 | 94.7 |
| Comparative Embodiment 4 | 8.75 | 188 | 97.8 |
| Comparative Embodiment 5 | 8.75 | 302 | 98.0 |
| Embodiment 1 | 8.75 | 345 | 97.1 |
| Embodiment 2 | 8.75 | 392 | 97.5 |
| Embodiment 3 | 8.75 | 399 | 97.7 |
| Embodiment 4 | 8.75 | 421 | 97.6 |
| Embodiment 5 | 8.75 | 436 | 97.6 |
| Embodiment 6 | 8.75 | 482 | 98.1 |
| Embodiment 7 | 8.75 | 430 | 97.2 |
| Embodiment 8 | 3.74 | 381 | 97.0 |
| Embodiment 9 | 30 | 386 | 97.4 |
| Embodiment 10 | 8.75 | 379 | 97.9 |
| Embodiment 11 | 8.75 | 478 | 97.2 |
| Embodiment 12 | 29.0 | 336 | 96.6 |
| Embodiment 13 | 18.71 | 369 | 96.7 |
| Embodiment 14 | 6.75 | 353 | 96.5 |
| Embodiment 15 | 9.25 | 368 | 96.8 |
| Embodiment 16 | 13.13 | 371 | 97.0 |
| Embodiment 17 | 6.56 | 356 | 96.7 |
| Embodiment 18 | 8.75 | 324 | 98.0 |
| Embodiment 19 | 8.75 | 347 | 98.0 |
| Embodiment 20 | 8.75 | 368 | 97.9 |
| Embodiment 21 | 8.75 | 412 | 97.3 |

As can be seen from Embodiment 2 versus Comparative Embodiment 5, the first-charge specific capacity of the positive active material in this application is high, and can effectively compensate for the loss of lithium caused by the generation of the SEI, thereby increasing the energy density of the battery.

As can be seen from Embodiments 1, 2 and 7 versus Comparative Embodiments 1 to 3, this application endows the lithium-ion battery with good cycle performance and C-rate performance by controlling the positive electrode resistance R, the compaction density P, and the single-side areal density Q to satisfy $3.5 \leq R \cdot P/Q \leq 30$.

As can be seen from Embodiments 1, 2, 7, 8, and 9 versus Comparative Embodiment 1, the fluoroethylene carbonate added to the electrolyte solution in this application can work synergistically with the positive electrode lithium supplementing policy. During the first charge, a large amount of active lithium is intercalated into the negative electrode, thereby leading to a further decrease in the true potential of the negative electrode. Consequently, the solvent in the electrolyte solution continues a reduction reaction, thereby impairing the cycle performance. By adding the fluoroethylene carbonate into the electrolyte solution, this application can induce the generation of a denser and thinner SEI layer, thereby preventing continuous depletion of the electrolyte solution. In addition, the fluoroethylene carbonate is more resistant to high-voltage oxidation, thereby increasing the cycle life in a high-voltage range. Better high-temperature cycle performance can be achieved by controlling the mass percent of the fluoroethylene carbonate in the electrolyte solution to be less than or equal to 15%.

References to "some embodiments", "part of embodiments", "an embodiment", "another example", "example", "specific example" or "some examples" throughout the specification mean that at least one embodiment or example in this application includes specific features, structures, materials, or characteristics described in the mentioned embodiment(s) or example(s). Therefore, descriptions throughout the specification, which make references by using expressions such as "in some embodiments", "in an embodiment", "in one embodiment", "in another example", "in an example", "in a specific example", or "example", do not necessarily refer to the same embodiment or example in this application. In addition, specific features, structures, materials, or characteristics herein may be combined in one or more embodiments or examples in any appropriate manner.

Although illustrative embodiments have been demonstrated and described above, a person skilled in the art understands that the foregoing embodiments are never to be construed as a limitation on this application, and changes, replacements, and modifications may be made to the embodiments without departing from the spirit, principles, and scope of this application.

What is claimed is:

1. An electrochemical device, comprising: a positive electrode, a negative electrode, a separator, and an electrolyte solution; wherein the positive electrode comprises a positive active material layer, and the positive active material layer comprises a positive active material represented by Formula (1):

$$Li_{1+r}Ni_{1-p-q}M1_pM2_qO_{2-s}M3_s \qquad \text{Formula (1),}$$

in Formula (1), 0<r≤1, 0<p<1, 0<q<1, 0<p+q<0.5, 0≤s<0.2, M1 and M2 each are independently at least one of Co, Mn, Fe, Ti, Al, V, Cr, Nb, Zr, La, or Y, and M3 is at least one of S, N, F, Cl, or Br;

a resistance of the positive electrode is R (in Ω), a compaction density of the positive electrode is P (in g/cm³), a single-side areal density of the positive electrode is Q (in g/mm²), wherein Q is calculated according to Q=1540.25×m/Ar, where m is a mass of the positive active material layer (in g), and Ar is an area of the positive active material layer (in mm²), and

$$3.5 \leq R \cdot P/Q \leq 30;$$

the electrolyte solution comprises fluoroethylene carbonate.

2. The electrochemical device according to claim 1, wherein $$5.0 \le R \cdot P/Q \le 12.$$

3. The electrochemical device according to claim 1, wherein $R \le 3$.

4. The electrochemical device according to claim 1, wherein $R \le 1.5$.

5. The electrochemical device according to claim 1, wherein $2.8 < P \le 3.6$.

6. The electrochemical device according to claim 1, wherein $0.16 < Q < 0.32$.

7. The electrochemical device according to claim 1, wherein $0.2 < Q < 0.32$.

8. The electrochemical device according to claim 1, wherein, based on a total mass of the electrolyte solution, a mass percent of fluoroethylene carbonate is greater than 0 and less than or equal to 15%.

9. The electrochemical device according to claim 1, wherein, based on a total mass of the positive active material layer, a mass percent of the positive active material is 80% to 98%.

10. The electrochemical device according to claim 1, wherein the positive active material exhibits a phase A and a phase B, the phase A exhibits a characteristic diffraction peak A1 of a (003) crystal plane at 17° to 19°, the phase B exhibits a characteristic diffraction peak B1 of a (001) crystal plane at 16° to 18°, and an intensity $I_A$ of the characteristic diffraction peak A1 and an intensity $I_B$ of the characteristic diffraction peak B1 satisfy $$0 \le I_A/I_B < 100.$$

11. An electronic device, comprising an electrochemical device, wherein the electrochemical device comprises a positive electrode, a negative electrode, a separator, and an electrolyte solution; wherein the positive electrode comprises a positive active material layer, and the positive active material layer comprises a positive active material represented by Formula (1):

in Formula (1), $0 < r \le 1$, $0 < p < 1$, $0 < q < 1$, $0 < p+q < 0.5$, $0 \le s < 0.2$, M1 and M2 each are independently at least one of Co, Mn, Fe, Ti, Al, V, Cr, Nb, Zr, La, or Y, and M3 is at least one of S, N, F, Cl, or Br;

a resistance of the positive electrode is R (in Ω), a compaction density of the positive electrode is P (in g/cm³), a single-side areal density of the positive electrode is Q (in g/mm²), wherein Q is calculated according to Q=1540.25×m/Ar, where m is a mass of the positive active material layer (in g), and Ar is an area of the positive active material layer (in mm²), and $$3.5 \le R \cdot P/Q \le 30;$$

the electrolyte solution comprises fluoroethylene carbonate.

12. The electronic device according to claim 11, wherein $5.0 \le R \cdot P/Q \le 12$.

13. The electronic device according to claim 11, wherein $R \le 3$.

14. The electronic device according to claim 11, wherein $R \le 1.5$.

15. The electronic device according to claim 11, wherein $2.8 < P \le 3.6$.

16. The electronic device according to claim 11, wherein $0.16 < Q < 0.32$.

17. The electronic device according to claim 11, wherein $0.2 < Q < 0.32$.

18. The electronic device according to claim 11, wherein based on a total mass of the electrolyte solution, a mass percent of fluoroethylene carbonate is greater than 0 and less than or equal to 15%.

19. The electronic device according to claim 11, wherein based on a total mass of the positive active material layer, a mass percent of the positive active material is 80% to 98%.

20. The electronic device according to claim 11, wherein the positive active material exhibits a phase A and a phase B, the phase A exhibits a characteristic diffraction peak A1 of a (003) crystal plane at 17° to 19°, the phase B exhibits a characteristic diffraction peak B1 of a (001) crystal plane at 16° to 18°, and an intensity $I_A$ of the characteristic diffraction peak A1 and an intensity $I_B$ of the characteristic diffraction peak B1 satisfy $$0 \le I_A/I_B < 100.$$

* * * * *